(12) United States Patent
Huang et al.

(10) Patent No.: US 8,310,455 B2
(45) Date of Patent: Nov. 13, 2012

(54) ELECTRONIC APPARATUS AND INPUT INTERFACE THEREOF

(75) Inventors: Hsing-Chiang Huang, Taoyuan County (TW); Kuo-Chen Wu, Taoyuan County (TW); Tsung-Yuan Ou, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 845 days.

(21) Appl. No.: 12/339,100

(22) Filed: Dec. 19, 2008

(65) Prior Publication Data

US 2009/0160812 A1 Jun. 25, 2009

Related U.S. Application Data

(60) Provisional application No. 61/015,671, filed on Dec. 21, 2007.

(51) Int. Cl.
*G06F 3/041* (2006.01)
(52) U.S. Cl. ........................................ 345/173
(58) Field of Classification Search ................ 345/173, 345/204; 324/686; 341/20; 715/784
See application file for complete search history.

(56) References Cited

U.S. PATENT DOCUMENTS

| | | | |
|---|---|---|---|
| 4,158,216 A | 6/1979 | Bigelow | |
| 4,233,593 A | 11/1980 | Bigelow | |
| 5,659,297 A | 8/1997 | Tatavoosian | |
| 6,657,615 B2 | 12/2003 | Harada | |
| 6,865,718 B2 | 3/2005 | Levi Montalcini | |
| 7,215,319 B2 | 5/2007 | Kamijo | |
| 7,253,643 B1 * | 8/2007 | Seguine | 324/686 |
| 7,348,967 B2 * | 3/2008 | Zadesky et al. | 345/173 |
| 7,499,040 B2 * | 3/2009 | Zadesky et al. | 345/204 |
| 2003/0063073 A1 | 4/2003 | Geaghan | |
| 2003/0122774 A1 | 7/2003 | Harada | |
| 2004/0252109 A1 | 12/2004 | Trent, Jr. | |
| 2005/0104867 A1 | 5/2005 | Westerman | |
| 2006/0012580 A1 | 1/2006 | Perski | |
| 2006/0028455 A1 | 2/2006 | Hinckley | |
| 2006/0048073 A1 | 3/2006 | Jarrett | |

(Continued)

FOREIGN PATENT DOCUMENTS

CN 1117312 C 8/2003

(Continued)

OTHER PUBLICATIONS

Office action mailed on Oct. 4, 2011 for the U.S. Appl. No. 12/329,623, filed Dec. 7, 2008, p. 1-18.

(Continued)

*Primary Examiner* — Fred Tzeng
(74) *Attorney, Agent, or Firm* — Winston Hsu; Scott Margo

(57) ABSTRACT

An electronic apparatus includes an input interface, a controller and a processor. The input interface includes a first touch sensing region, a second touch sensing region and a third sensing region. The first touch sensing region has a plurality of touch pads arranged in a radial array. The second touch sensing region and the third touch sensing region are respectively adjacent to two sides of the first touch sensing region, and each includes a plurality of touch pads arranged in a matrix array. The controller is coupled to each of the touch pads for detecting a user input on the user interface and generating a plurality of sensing signals according to the user input. The processor is electrically coupled to the controller, and executes a corresponding function according to the plurality of sensing signals.

12 Claims, 6 Drawing Sheets

U.S. PATENT DOCUMENTS

| | | | |
|---|---|---|---|
| 2006/0250372 A1 | 11/2006 | Lii | |
| 2007/0013674 A1 | 1/2007 | Woolley | |
| 2007/0109280 A1 | 5/2007 | Sigona | |
| 2007/0242057 A1* | 10/2007 | Zadesky et al. | 345/173 |
| 2007/0273671 A1* | 11/2007 | Zadesky et al. | 345/173 |
| 2007/0276525 A1 | 11/2007 | Zadesky | |
| 2007/0283263 A1 | 12/2007 | Zawde | |
| 2007/0291016 A1 | 12/2007 | Philipp | |
| 2008/0012837 A1 | 1/2008 | Marriott | |
| 2008/0018615 A1* | 1/2008 | Zadesky et al. | 345/173 |
| 2008/0084397 A1* | 4/2008 | On et al. | 345/173 |
| 2008/0088600 A1 | 4/2008 | Prest | |
| 2008/0284742 A1 | 11/2008 | Prest | |
| 2009/0083659 A1* | 3/2009 | Tatehata et al. | 715/784 |
| 2009/0153518 A1* | 6/2009 | Paczkowski | 345/173 |
| 2009/0160680 A1* | 6/2009 | Ou et al. | 341/20 |

FOREIGN PATENT DOCUMENTS

| | | |
|---|---|---|
| CN | 1596412 A | 3/2005 |
| KR | 100781706 B1 | 12/2007 |
| TW | I262427 | 9/2006 |
| TW | 200639681 | 11/2006 |
| TW | I269997 | 1/2007 |
| TW | I270398 | 1/2007 |
| TW | 200739391 | 10/2007 |

OTHER PUBLICATIONS

Office action mailed on Feb. 3, 2012 for the U.S. Appl. No. 12/337,645, filed Dec. 18, 2008, p. 1-12.

Office action mailed on Feb. 1, 2012 for the U.S. Appl. No. 12/329,623, filed Dec. 7, 2008, p. 1-17.

Office action mailed on Feb. 9, 2012 for the Taiwan application No. 097133200, filing date Aug. 29, 2008, p. 1-8.

Office action mailed on Apr. 9, 2012 for the Taiwan application No. 097143514, filing date Nov. 11, 2008, p. 1-12.

Office action mailed on Mar. 23, 2012 for the U.S. Appl. No. 12/333,324, filed Dec. 12, 2008, p. 1-38.

Office action mailed on May 14, 2012 for the Taiwan application No. 097141328, filing date Oct. 28, 2008, p. 1-6.

Office action mailed on May 14, 2012 for the Taiwan application No. 097142618, filing date Nov. 5, 2008, p. 1-6.

Office action mailed on Sep. 12, 2011 for the U.S. Appl. No. 12/337,645, filed Dec. 18, 2008, p. 1-14.

Office action mailed on Apr. 9, 2012 for the Taiwan application No. 097143513, filing date Nov. 11, 2008, p. 1-10.

Office action mailed on Jul. 25, 2012 for the Taiwan application No. 097137454, filing date Sep. 30, 2008, p. 1-6.

Office action mailed on Aug. 31, 2012 for the U.S. Appl. No. 12/334,530, filing date Dec. 15, 2008, p. 1-41.

* cited by examiner

ELECTRONIC APPARATUS AND INPUT INTERFACE THEREOF

RELATED APPLICATION

This non-provisional application claims the benefit of U.S. provisional application No. 61/015,671, filed on Dec. 21, 2007 and included herein by reference.

BACKGROUND OF THE INVENTION

1. Field of the Invention

The present invention relates to an electronic device, and more particularly, to an electronic device having a touch sensing region.

2. Description of the Prior Art

In general, a touch panel (sensing region) of a conventional hand-held electronic apparatus is designed in the shape of a doughnut for receiving a rotating motion from a user. Taking FIG. 1 for example, FIG. 1 is a diagram illustrating a user to move his/her finger on a touch panel to operate a hand-held electronic apparatus (e.g., a multimedia player). However, when the user moves his/her finger without watching the touch panel, the finger may easily move out of the edge of the touch panel. Thus, the user will fail to properly control the hand-held electronic apparatus to achieve a desired function as expected.

SUMMARY OF THE INVENTION

It is therefore one objective of the present invention to provide an electronic device that has a rectangular touch sensing region, in order to solve the above-mentioned problem.

According to an exemplary embodiment of the present invention, an electronic device is disclosed. The electronic device comprises a display for displaying information; and an input interface disposed next to the display and comprises a first touch sensing region having a plurality of touch pads arranged therein in a radial array; a second touch sensing region adjacent to a side of the first touch sensing region and having a plurality of touch pads arranged therein in a matrix array; and a third sensing region adjacent to another side of the first touch sensing region and having a plurality of touch pads arranged therein in a matrix array; wherein the first touch sensing region is positioned between the second touch sensing region and the third touch sensing region; a controller, which is electrically coupled to each touch pad in the input interface, for detecting a user input on the input interface and generating a plurality of sensing signals according to the user input; and a processor, which is electrically coupled to the controller, for executing a corresponding function according to the plurality of sensing signals.

According to an exemplary embodiment of the present invention, an input interface is also disclosed. The input interface comprises a first touch sensing region, which has a plurality of touch pads that are arranged in a radial array; a second touch sensing region, which is adjacent to a side of the first touch sensing region and has a plurality of touch pads that are arranged in a matrix array; and a third sensing region, which is adjacent to another side of the first touch sensing region and has a plurality of touch pads that are arranged in a matrix array; wherein the first touch sensing region is positioned between the second touch sensing region and the third touch sensing region.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "electrically connect" is intended to mean either an indirect or direct electrical connection. Accordingly, if one device is coupled to another device, that connection may be through a direct electrical connection, or through an indirect electrical connection via other devices and connections.

Figure 1:
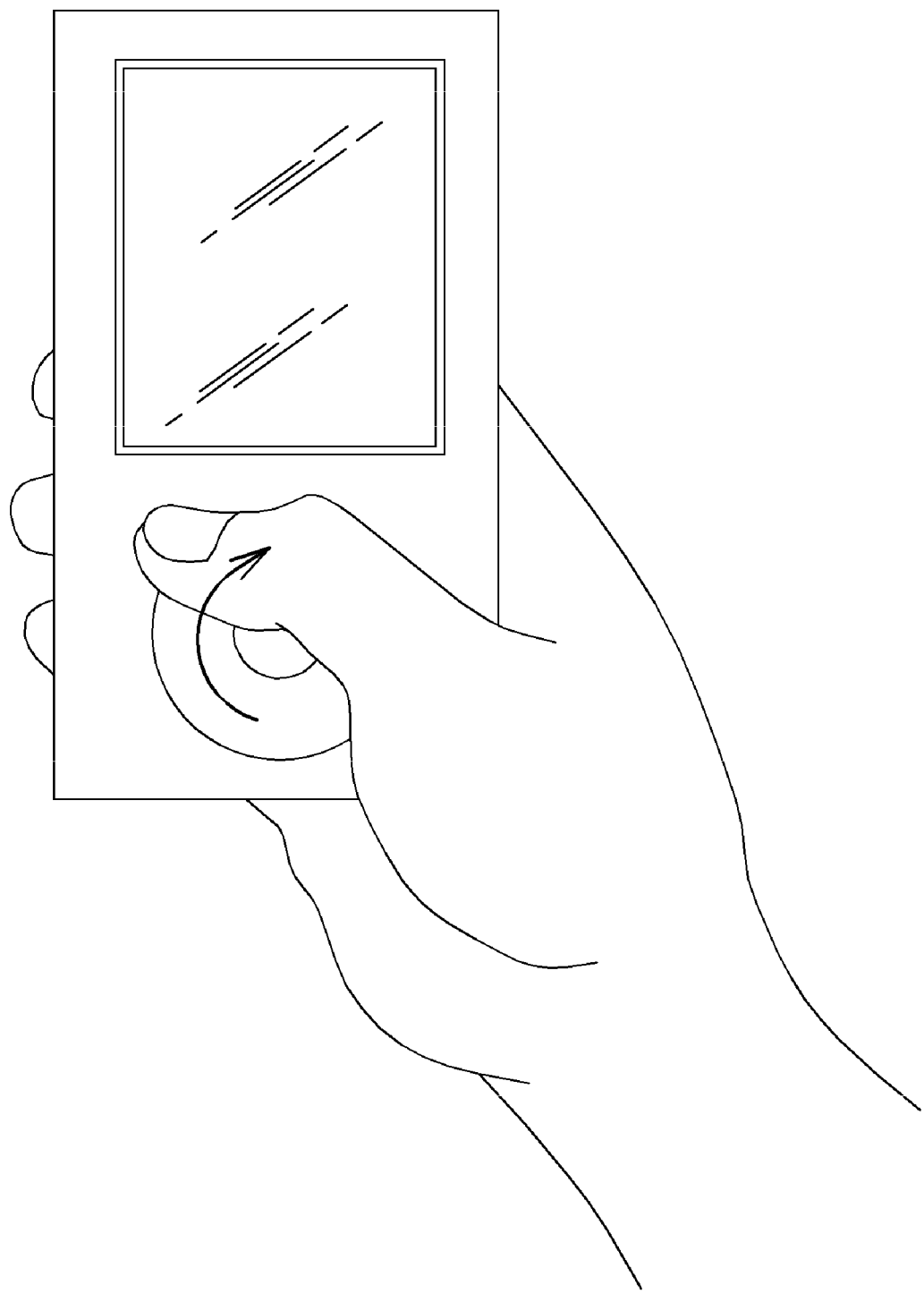
FIG. 1 is a diagram illustrating a user moving his/her finger on a touch panel to operate a hand-held electronic apparatus.
Figure 2:
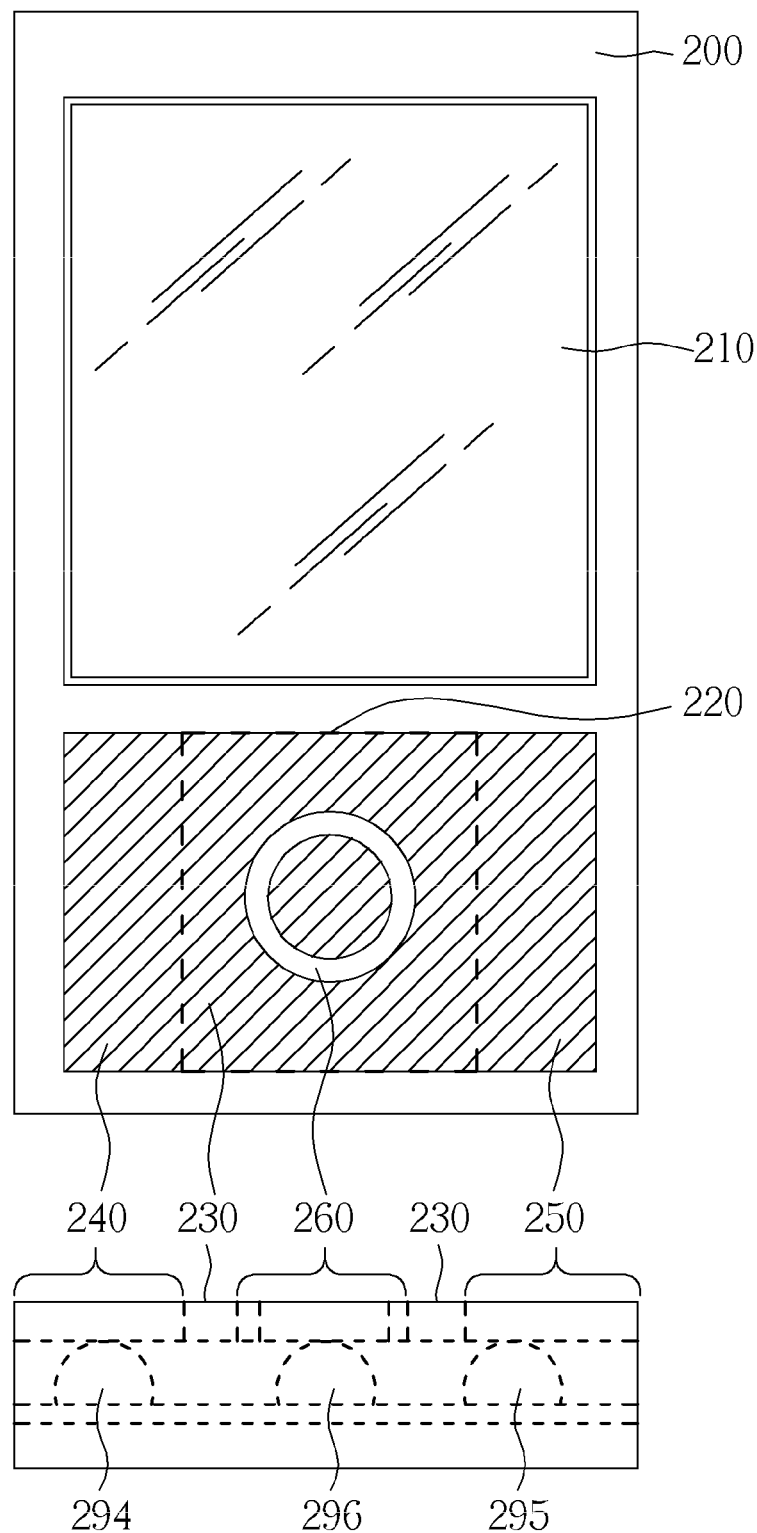
FIG. 2 is a schematic diagram illustrating an electronic device according to an embodiment of the present invention.

Please refer to FIG. 2. FIG. 2 is a schematic diagram illustrating an electronic device 200 according to an embodiment of the present invention. As shown in FIG. 2, the electronic device 200 comprises a display 210 for displaying information and an input interface 220 adjacent to the display 210. The input interface 220 comprises a first touch sensing region 230, a second touch sensing region 240 and a third touch sensing region 250. The first touch sensing region 230 is positioned between the second touch sensing region 240 and the third touch sensing region 250 and surrounds a central region 260. The second touch sensing region 240 and the third touch sensing region 250 are respectively adjacent to two sides of the first touch sensing region 230. The first touch sensing region 230, the second touch sensing region 240 and the third touch sensing region 250 as a whole form a substantially rectangular shape that and have a width substantially equal to that of the display 210.

Figure 3:
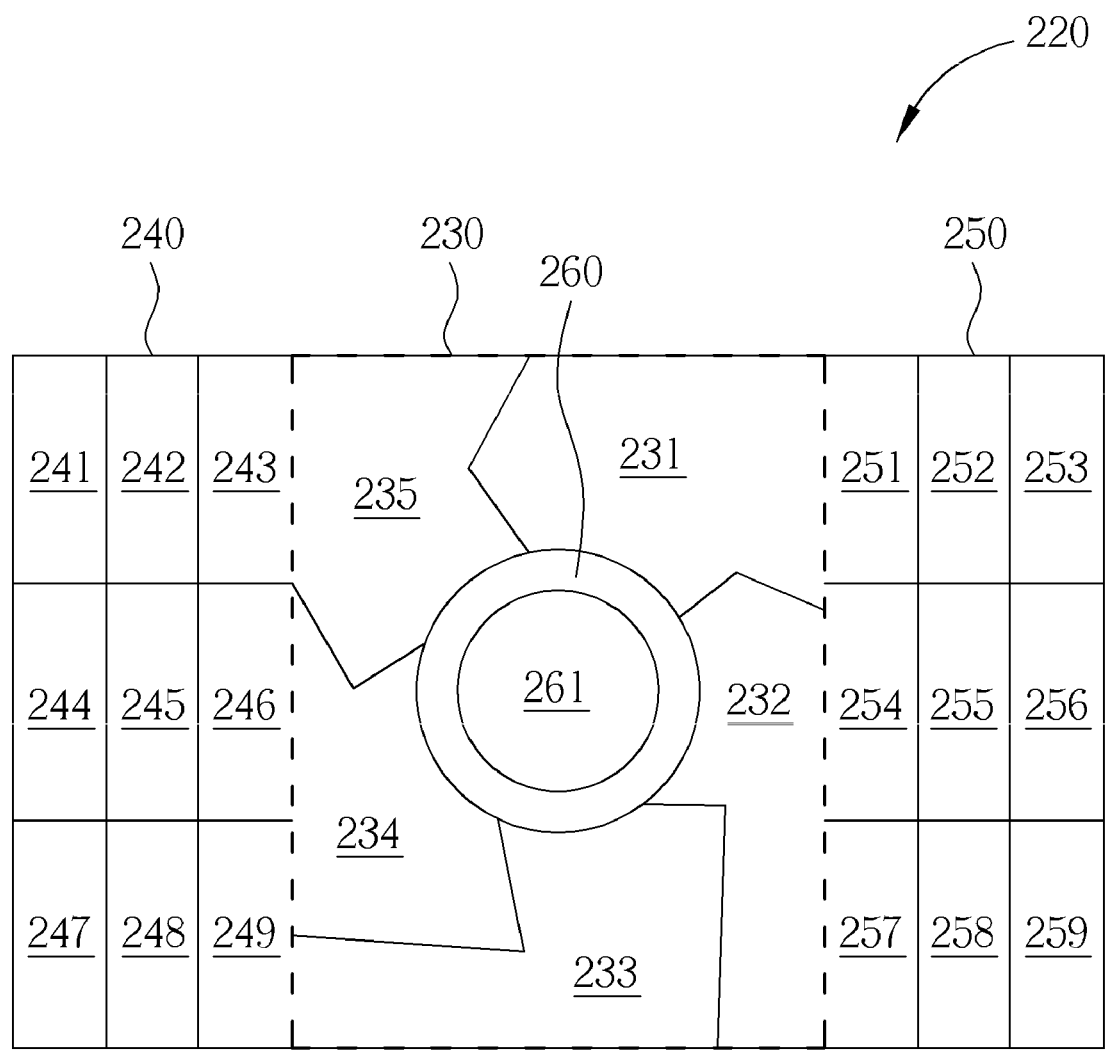
FIG. 3 is a diagram illustrating the input interface shown in FIG. 2.

Please refer to FIG. 3. FIG. 3 is a diagram illustrating the input interface 220 shown in FIG. 2. As shown in FIG. 3, the first touch sensing region 230 is in a rectangular shape and has a plurality of independent touch pads 231, 232, 233, 234, 235 disposed therein; the second touch sensing region 240 is in a rectangular shape and has a plurality of independent touch pads 241, 242, 243, 244, 245, 246, 247, 248, 249 disposed therein; the third touch sensing region 250 is in a rectangular shape and has a plurality of independent touch pads 251, 252, 253, 254, 255, 256, 257, 258, 259; the central region 260 has a central touch pad 261 disposed therein. In addition, there are metal dome switches 294, 295, 296 disposed under the second touch sensing region 240, the third touch sensing region 250 and the central touch pad 261, respectively. Each of the metal dome switches 294, 295, 296 is configured for detecting a press on the second touch sensing region 240, the third touch sensing region 250 and the central touch pad 261 and generating an electronic signal in response to the detected press.

Figure 4:
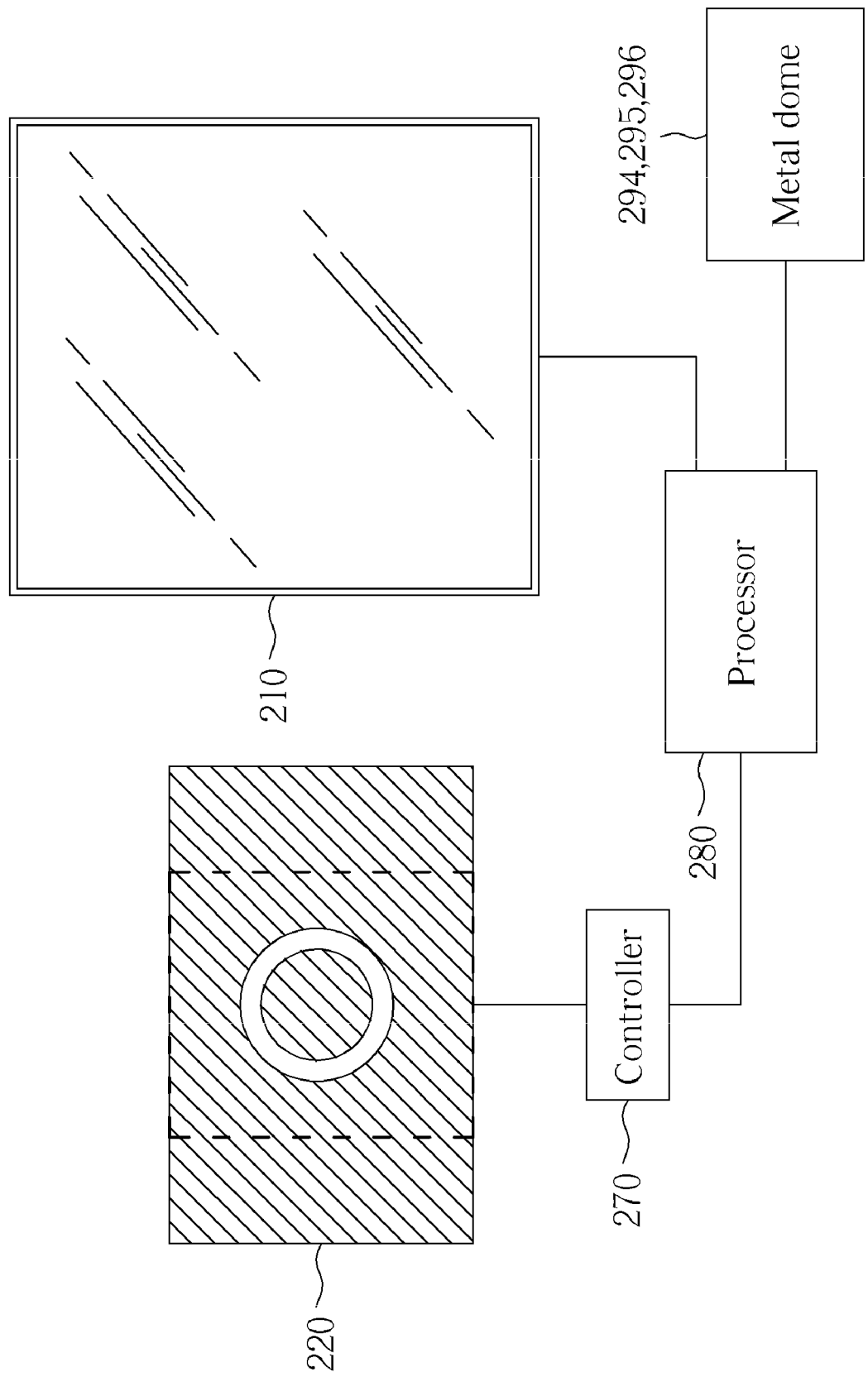
FIG. 4 is a block diagram illustrating the electronic device shown in FIG. 2.

Please refer to FIG. 4. FIG. 4 is a block diagram illustrating the electronic device 200 shown in FIG. 2. As shown in FIG. 4, the electronic device 200 further comprises a controller 270 and a processor 280. The input interface 220 is configured for receiving a user input. The controller 270 is electrically coupled to each touch pad 231-235, 241-249, 251-259, 261 in the input interface 220 (the coupling relation is not shown in FIG. 4) for detecting the user input on the input interface 220 and generating a plurality of sensing signals according to the user input. The processor 280 is electrically coupled to the display 210, the controller 270 and the metal dome switches 294, 295, 296, and executes a corresponding function according to the sensing signals generated by the controller 270 or the electronic signals generated from the metal dome switches 294, 295, 296.

Further description of the electronic device 200 is detailed as follows. In this embodiment, the electronic device 200 is a personal digital assistant (PDA); however, this is merely for illustrative purposes and is not a limitation of the present invention. In other embodiments of the present invention, the electronic device may be a handheld communication apparatus (e.g., a mobile phone) or a multimedia player.

Figure 5:
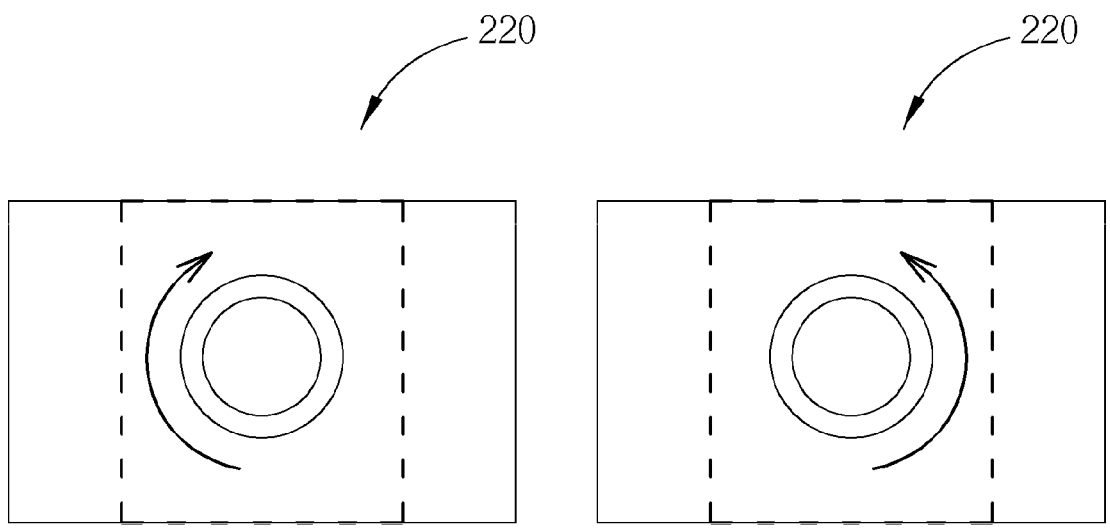
FIG. 5 is a diagram illustrating the input interface shown in FIG. 2 receiving a rotating motion from a user.
Figure 6:
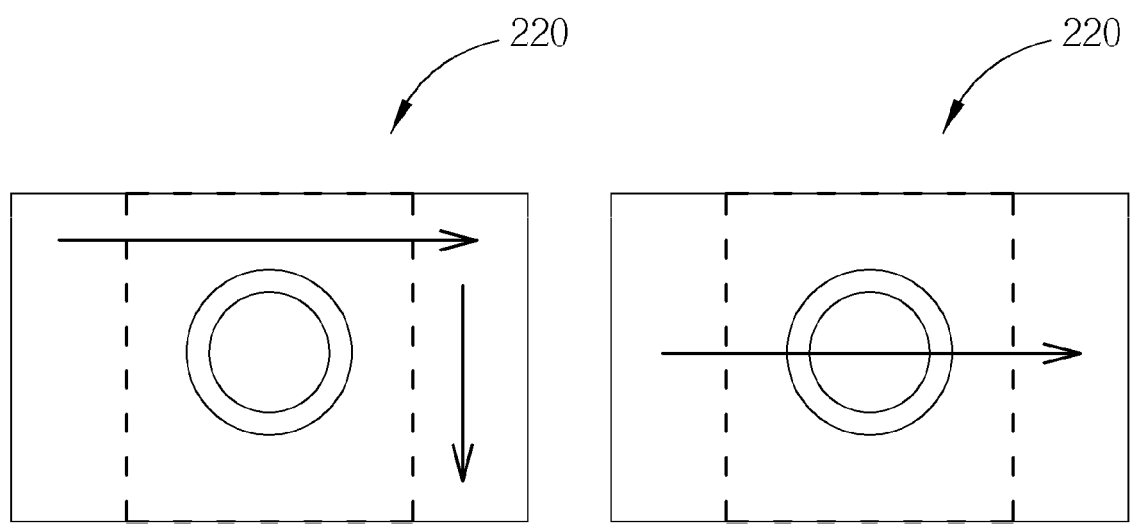
FIG. 6 is a diagram illustrating the input interface shown in FIG. 2 receiving a panning motion from a user.

Please refer to FIG. 4. As shown in FIG. 4, the touch pads 231-235 are arranged in a radial array in the first touch sensing region 230; the touch pads 241-249 are arranged in a matrix array in the second touch sensing region 240; the touch pads 251-259 are arranged in a matrix array in the third touch sensing region 250. Accordingly, the input interface 220 is not only able to receive a rotation motion from a user on the first touch sensing region 230 (as shown in FIG. 5), but also able to receive a panning motion from the user on the first, second and third touch sensing regions 230, 240, 250 (as shown in FIG. 6).

Please note that, in the abovementioned embodiment, the central region 260 has the central touch pad 261 disposed therein; however, this is not a limitation of the present invention. In other embodiments of the present invention, there may be not any touch pad in the central region 260. Any alternative design also falls within the scope of the present invention.

Please note that, in the abovementioned embodiment, each of the touch pads in the first touch sensing region 230 has a saw-tooth edge and is connected to one another with the a saw-tooth edge in order to increase the sensitivity of the first touch sensing region 230; however, this is not a limitation of the present invention.

Please note that, in the abovementioned embodiment, each touch pad 231-235, 241-249, 251-259, 261 in the input interface 220 is a capacitive touch pad; however, this is merely for illustrative purposes and is not a limitation of the present invention. In other embodiments of the present invention, the touch pads in the input interface 220 may be inductive touch pads, resistive touch pads or any combination of the capacitive, inductive and resistive touch pads.

Compared with the prior art, the electronic apparatus of the present invention receives a rotating motion from a user with a rectangular touch sensing region (e.g., the first touch sensing region 230), so the user's finger will not easily slide out of the edge of the touch sensing region even though the user is not watching the touch sensing region. Therefore, the difficulty of accurately controlling the electronic apparatus is considerably decreased. In addition, the electronic apparatus of the present invention further comprises a touch sensing region formed by a plurality of touch pads arranged in a grid matrix, such as the second touch sensing region 240 and the third touch sensing region 250, so the electronic apparatus of the present invention is also able to receive a panning motion from the user. Moreover, there are metal dome switches (e.g., the metal dome switches 294, 295, 296) disposed under the second touch sensing region 240, the third touch sensing region 250 and the central touch pad 261, so the electronic apparatus of the present invention is further able to receive a pressing motion from the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic apparatus, comprising:
   a display for displaying information;
   an input interface disposed adjacent to the display, the input interface comprising:
      a first touch sensing region having a plurality of touch pads arranged in a radial array therein;
      a second touch sensing region adjacent to a side of the first touch sensing region, the second touch sensing region having a plurality of touch pads arranged in a matrix array therein; and
      a third sensing region adjacent to another side of the first touch sensing region, the third sensing region having a plurality of touch pads arranged in a matrix array therein;
      wherein the first touch sensing region is positioned between the second touch sensing region and the third touch sensing region;
   a controller, electrically coupled to each touch pad in the input interface, for detecting a user input on the input interface and generating a plurality of sensing signals according to the user input; and
   a processor, electrically coupled to the controller, for executing a corresponding function according to the plurality of sensing signals;
   wherein each of the touch pads in the first touch sensing region has a saw-tooth edge and is connected to one another with the saw-tooth edge.

2. The electronic apparatus of claim 1, wherein the matrix array is a grid matrix.

3. The electronic apparatus of claim 1, wherein the first touch sensing region surrounds a central region.

4. The electronic apparatus of claim 3, wherein the central region has a central touch pad disposed therein, and the central touch pad is electrically coupled to the controller.

5. The electronic apparatus of claim 4, wherein the input interface further comprises a switch, which is disposed under the central touch pad and electrically coupled to the processor, for detecting a press on the central touch pad and generating an electronic signal in response to the pressure.

6. The electronic apparatus of claim 1, which is a hand-held electronic apparatus, wherein the first touch sensing region, the second touch sensing region and the third touch sensing region as a whole have a width substantially equal to that of the display.

7. The electronic apparatus of claim 1, wherein the first touch sensing region, the second touch sensing region and the third touch sensing region as a whole form a substantially rectangular shape.

8. The electronic apparatus of claim 1, wherein each of touch pads in the first touch sensing region, the second touch sensing region and the third touch sensing region is a capacitive touch pad.

9. An input interface for an electronic apparatus, comprising:
- a first touch sensing region having a plurality of touch pads arranged in a radial array therein;
- a second touch sensing region adjacent to a side of the first touch sensing region, the second touch sensing region having a plurality of touch pads arranged in a matrix array therein; and
- a third sensing region adjacent to another side of the first touch sensing region, the third sensing region having a plurality of touch pads arranged in a matrix array therein;

wherein the first touch sensing region is positioned between the second touch sensing region and the third touch sensing region, and each of the touch pads in the first touch sensing region has a saw-tooth edge and connected to one another with the saw-tooth pattern edge.

10. The input interface of claim 9, wherein the matrix array is a grid matrix.

11. The input interface of claim 9, wherein the first touch sensing region, the second touch sensing region and the third touch sensing region as a whole form a substantially rectangular shape.

12. The input interface of claim 9, wherein each of touch pads in the first touch sensing region, the second touch sensing region and the third touch sensing region is a capacitive touch pad.

* * * * *